United States Patent
Chen et al.

(10) Patent No.: US 8,724,852 B2
(45) Date of Patent: May 13, 2014

(54) METHOD FOR SENSING MOTION AND DEVICE FOR IMPLEMENTING THE SAME

(75) Inventors: Meng-Kun Chen, New Taipei (TW); Chih-Hao Chen, New Taipei (TW)

(73) Assignee: Lite-On Semiconductor Corp., New Taipei (TW)

( * ) Notice: Subject to any disclaimer, the term of this patent is extended or adjusted under 35 U.S.C. 154(b) by 78 days.

(21) Appl. No.: 13/470,466

(22) Filed: May 14, 2012

(65) Prior Publication Data

US 2013/0051617 A1     Feb. 28, 2013

(30) Foreign Application Priority Data

Aug. 31, 2011   (CN) .................. 2011 1 0255702.0

(51) Int. Cl.
*G06K 9/00*     (2006.01)
(52) U.S. Cl.
USPC ........................................................ 382/103

(58) Field of Classification Search
None
See application file for complete search history.

(56) References Cited

U.S. PATENT DOCUMENTS

| 2011/0201381 A1* | 8/2011 | Herz et al. ................. 455/550.1 |
| 2012/0176504 A1* | 7/2012 | Lee et al. .................... 348/222.1 |
| 2013/0004016 A1* | 1/2013 | Karakotsios et al. ......... 382/103 |

* cited by examiner

*Primary Examiner* — Nirav G Patel
(74) *Attorney, Agent, or Firm* — Rosenberg, Klein & Lee (57) ABSTRACT

A method for sensing a motion of an object is to be implemented by a motion recognition device that includes an image acquiring unit and a processor. In the method, the image acquiring unit is configured to acquire a series of image frames by detecting intensity of light received thereby. The processor is configured to receive at least one of the image frames and to determine whether an object is detected in the at least one of the image frames. When an object is detected, the processor is further configured to receive the image frames from the image acquiring unit, and to determine a motion of the object with respect to a three-dimensional coordinate system according to the image frames thus received.

15 Claims, 7 Drawing Sheets

METHOD FOR SENSING MOTION AND DEVICE FOR IMPLEMENTING THE SAME

CROSS-REFERENCE TO RELATED APPLICATION

This application claims priority of Chinese Application No. 201110255702.0, filed on Aug. 31, 2011.

BACKGROUND OF THE INVENTION

1. Field of the Invention

The invention relates to a method for sensing motion, more particularly to a method for sensing motion and a device for implementing the same.

2. Description of the Related Art

Motion of an object, such as a gesture, has been introduced as an innovative way to interact with electronic devices (e.g., a cellphone, a television, a digital camera, a tablet computer, etc). As a result, it is important for such electronic devices to be capable of properly sensing the motion of the object. U.S. Patent Application Publication No. 2010/0150399 A1, entitled "Apparatus and Method for Optical Gesture Recognition", disclosed an optical gesture recognition system having a light source, an optical receiver and a processor. In the method for optical gesture recognition, the optical receiver is configured to receive reflected light from an object when the light source is activated, and to output a plurality of measured reflectance values according to the reflected light in different points of time. The processor is configured to compare the measured reflectance values to determine the relative motion of the object, and to identify a gesture corresponding to the relative motion of the object.

SUMMARY OF THE INVENTION

One object of the present invention is to provide a method for sensing motion.

Accordingly, a method of the present invention is for sensing a motion of an object. The method is to be implemented by a motion recognition device that includes an image acquiring unit and a processor. The method includes the following steps of:

configuring the image acquiring unit to acquire continuously a series of image frames by detecting intensity of light received thereby;

configuring the processor to receive at least one of the image frames and to determine whether an object is detected in said at least one of the image frames; and when an object is detected, configuring the processor to receive the image frames from the image acquiring unit, and to determine a motion of the object with respect to a three-dimensional coordinate system according to the image frames thus received.

Another object of the present invention is to provide a device for implementing the method for sensing motion.

Accordingly, a motion recognition device of the present invention includes an image acquiring unit and a processor.

The image acquiring unit includes a photodetector array and an analog-to-digital converter (ADC). The photodetector array includes a plurality of photodetectors that are arranged on a two-dimensional plane and that are operable to generate sense signals by detecting intensity of light received thereby. The ADC is coupled to the photodetector array for receiving the sense signals therefrom and is operable to convert the sense signals into image frames.

The processor is coupled to the ADC of the image acquiring unit and is operable to determine whether an object is detected in at least one of the image frames. When the determination is affirmative, the processor is operable to determine a motion of the object with respect to a three-dimensional coordinate system according to apart of the image frames that are acquired after acquisition of the at least one of the image frames where the object is detected.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
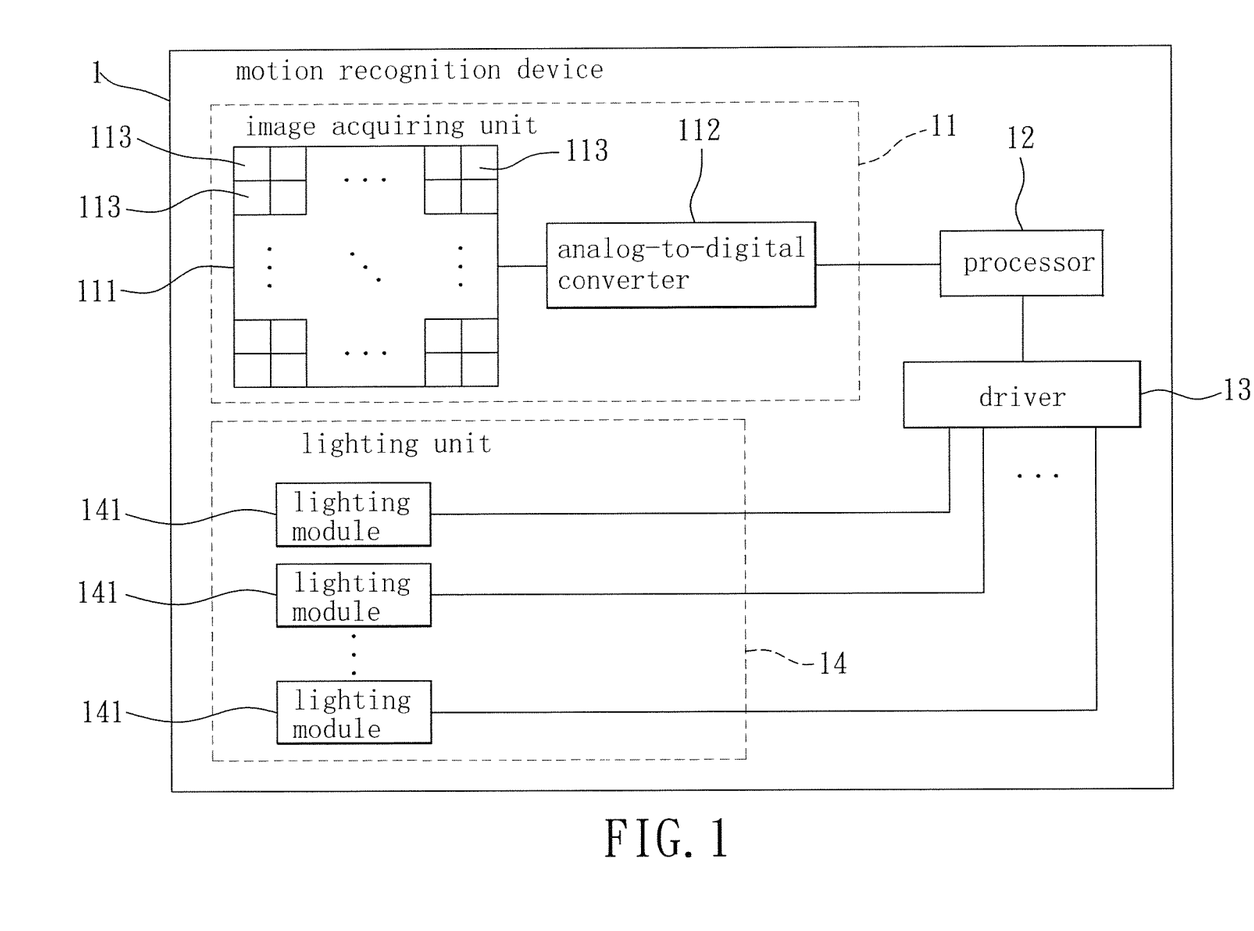
FIG. 1 is a schematic block diagram of a preferred embodiment of a motion recognition device according to the invention.

As shown in FIG. 1, the preferred embodiment of a motion recognition device 1 according to the present invention includes an image acquiring unit 11, a processor 12 electrically connected to the image acquiring unit 11, a driver 13 electrically connected to the processor 12, and a lighting unit 14 electrically connected to the driver 13.

The image acquiring unit 11 includes a photodetector array 111 and an analog-to-digital converter (ADC) 112. The photodetector array 111 includes a plurality of photodetectors 113 that are arranged on a two-dimensional plane and that are operable to continuously generate sense signals by detecting intensity of light received thereby. The ADC 112 is coupled to the photodetector array 111 for receiving the sense signals therefrom and is operable to continuously convert the sensing signals into a series of image frames, each of which has a plurality of pixel datasets. In this embodiment, each of the photodetectors 113 includes a color filter, such that each of the photodetectors 113 is, for example, a polychromatic color sensor, and as a result each of the image frames includes a plurality of pixel values. Moreover, the lighting unit 14 has a plurality of lighting modules 141 (and may have only one lighting module 141 in other embodiments) for providing a light source at an illumination area. Each of the lighting modules 141 includes a light emitting diode (LED) and/or a laser diode.

In this embodiment, the photodetector array 111 of the image acquiring unit 11 has a detection area, at least a part of which overlaps the illumination area of the lighting unit 141, and it is preferable to make overlapping area between the detection area and the illumination area as large as possible.

The processor 12 is operable to receive the image frames acquired by the image acquiring unit 11, to generate a control signal for controlling the lighting modules 141 of the lighting unit 14 through the driver 13, and to determine whether an object is detected in at least one of the image frames. In addition, when the determination is affirmative, the processor 12 is further operable to determine a motion of the object. The processor 12 may be further configured to perform an operation that is associated with the motion of the object. However, since execution of the motion-associated operation may be readily appreciated by those skilled in the art, and since it is not a feature of this invention, details thereof are omitted herein for the sake of brevity.

It is worth noting that, the processor 12 may be further operable to perform additional functions according to the image frames. Two examples of the additional functions are described in the following.

According to one example, since each of the photodetectors 113 includes a color filter, the processor 12 is operable to continuously obtain color temperature values that are associated with ambient light from the image frames. Then, the processor 12 is operable, according to the color temperature values, to calibrate and/or adjust a displayed image outputted by a display unit (e.g., the image frames acquired by the image acquiring unit 11), such as white balance adjustment, in order to make colors of the displayed image appear to have the same general appearance as colors in an original scene. This function can improve the quality of the displayed image outputted by the display unit.

According to another example, the processor 12 is operable to continuously obtain brightness values that are associated with ambient light from the image frames. Then, the processor 12 is further operable, according to the brightness values, to calibrate and/or adjust the displayed image outputted by of the display unit, such as the intensity of brightness associated with the backlight of the display unit. This function allows the display unit to provide a relatively comfortable visual effect and to use energy efficiently.

Figure 2:
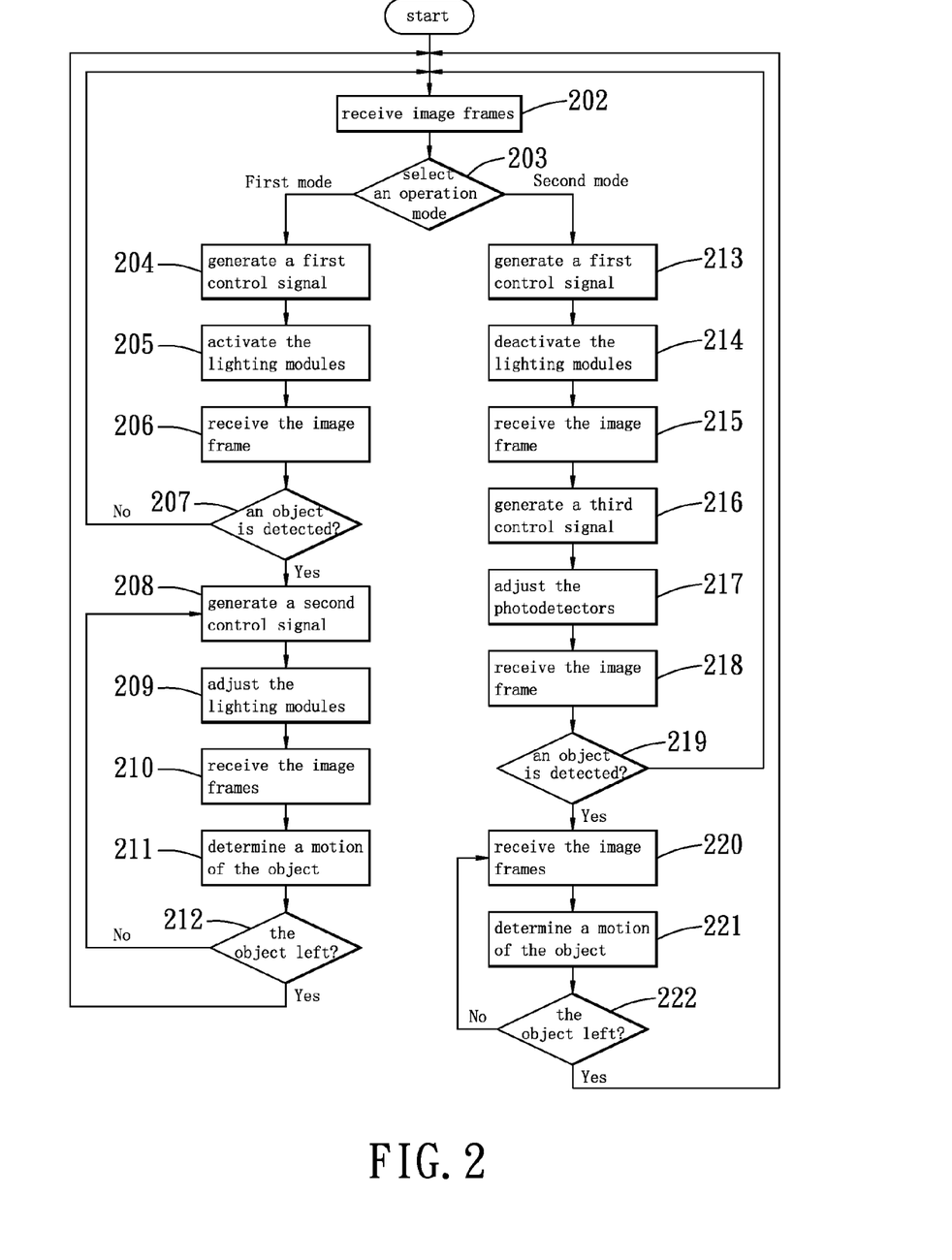
FIG. 2 is a flow chart of a method implemented by the motion recognition device of FIG. 1 for sensing a motion of an object.

Referring to FIGS. 1 and 2, a method for sensing a motion of an object is described in the succeeding paragraphs. During the procedure of the method, the image acquiring unit 11 is operable to continuously acquire a series of the image frames by detecting intensity of light received thereby. The processor 12 is operable to obtain continuously both a series of the color temperature values and a series of the brightness values for performing the aforementioned additional functions.

In step 202, the processor 12 is operable to receive at least one of the image frames from the image acquiring unit 11.

In step 203, the processor 12 is operable to perform an operation mode selecting procedure to select an operation mode. Further referring to FIG. 3, in this operation mode selecting procedure, the processor 12 is first operable to compute, from the at least one image frame received in step 202, a first luminance value that is associated with ambient light in sub-step 203(*a*). Afterwards, the processor 12 is operable to compare the first luminance value with a first predetermined threshold value (determined from previous experiments involving various ambient light intensities) in sub-step 203(*b*), and to select the first operation mode when the first luminance value is smaller than the first predetermined threshold value (i.e., intensity of the ambient light is not sufficient for the motion recognition device 1 to operate).

Figure 3:
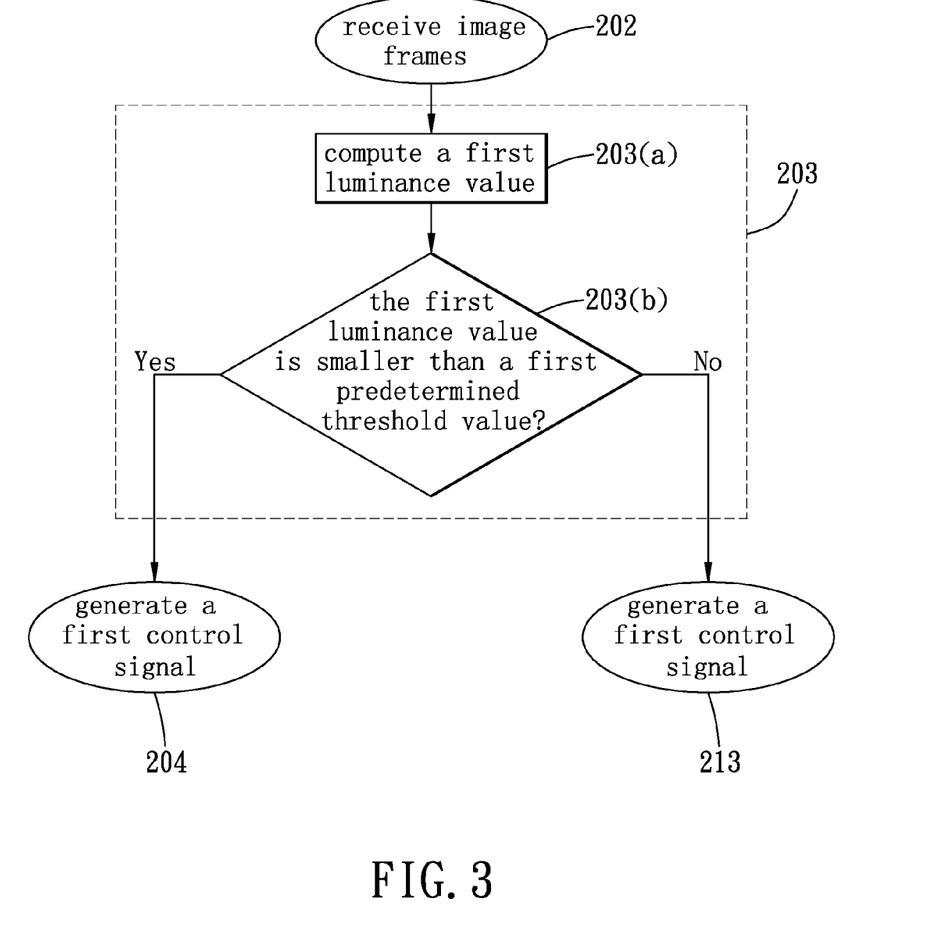
FIG. 3 is a flow chart illustrating steps of selecting an operation mode.

Otherwise, the processor 12 is operable to select the second operation mode when the first luminance value is larger than the predetermined threshold value (i.e., intensity of the ambient light is sufficient for the motion recognition device 1). In this embodiment, the processor 12 is configured to calculate an average of luminance values from the pixel data sets of one of the image frames as the first average luminance value.

The flow goes to step 204 when the first operation mode is selected, and goes to step 213 when the second operation mode is selected. In steps 204 and 213, the processor 12 is configured to generate a first control signal for controlling the lighting modules 141 of the lighting unit 14, based on a selected one of the first and second operation modes. In step 204, the first control signal generated by the processor 12 is for activating at least one of the lighting modules 141 of the lighting unit 14. In this embodiment, all of the lighting modules 141 are activated. In step 213, the first control signal generated by the processor 12 is for deactivating the lighting modules 141 of the lighting unit 14.

The following paragraphs are directed to the case where the first operation mode is selected. In step 205, the driver 13 is operable to activate the lighting modules 141 of the lighting unit 14 for providing the light source.

After the lighting modules 141 are activated, the processor 12 is operable to receive at least one image frame from the image acquiring unit 11 in step 206, and is operable to perform an object detecting procedure to determine whether an object is detected in said at least one image frame in step 207.

Figure 4:
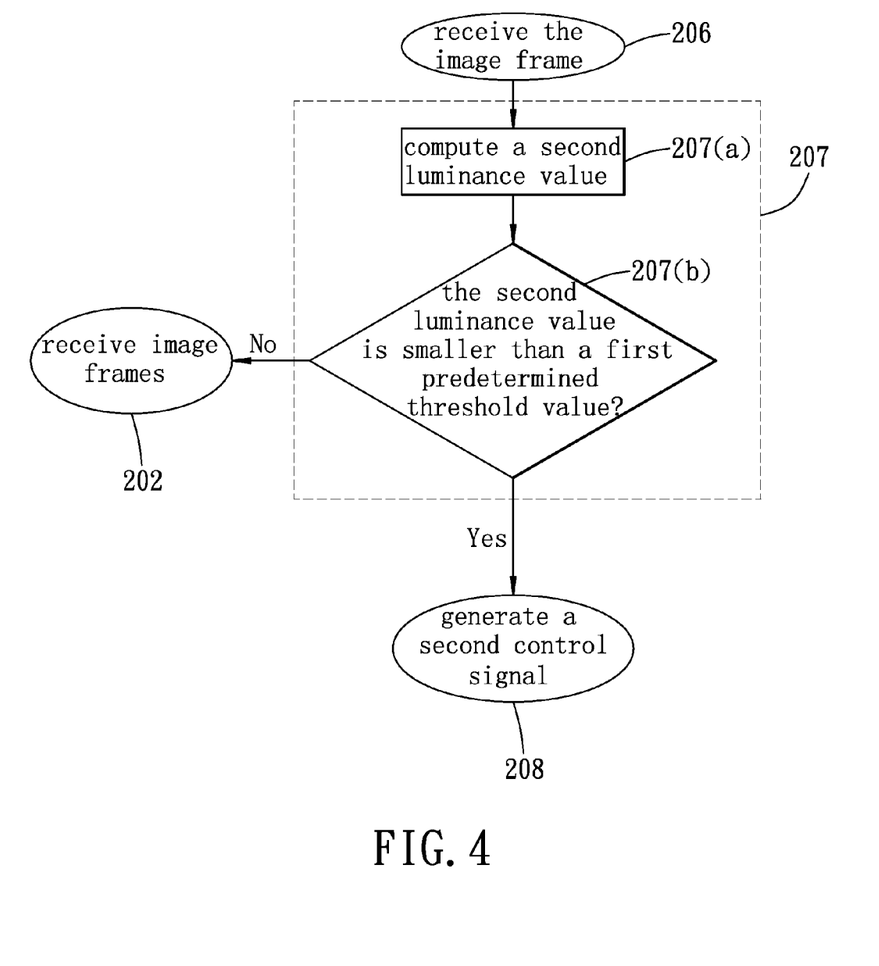
FIG. 4 is a flow chart illustrating steps of determining whether an object is detected.

Further referring to FIG. 4, in the object detecting procedure, in sub-step 207(*a*), the processor 12 is first operable to compute a second luminance value according to said at least one of the image frame received in step 206. Afterwards, the processor 12 is operable to compare the second luminance value with a second predetermined threshold value (determined from previous experiments involving various ambient light intensities when the lighting modules 141 are activated) in sub-step 207(*b*), and to determine that the object is detected in said at least one image frame received in step 206 when the second luminance value is larger than the second predetermined threshold value (i.e., the light emitted by the lighting modules 141 is reflected by the object). Similar to step 203, the processor 12 is configured to calculate an average of luminance values from the pixel data sets of said at least one image frame received in step 206 as the second luminance value. The flow goes to step 208 when the object is detected, and goes back to step 202 when otherwise.

In step 208, the processor 12 is operable to generate a second control signal for controlling the lighting modules 141 of the lighting unit 14. The driver 13 is operable, according to the second control signal, to adjust intensity of the light emitted by the lighting modules 141 in step 209, so as to obtain an optimum exposure for the image frames acquired thereafter.

After the intensity of the light emitted by the lighting modules 141 is adjusted, the processor 12 is operable to successively receive a series of image frames from the image acquiring unit 11 in step 210. Then, the processor 12 is operable to determine a motion of the object with respect to a three-dimensional coordinate system according to the image frames received in step 210.

Figure 7:
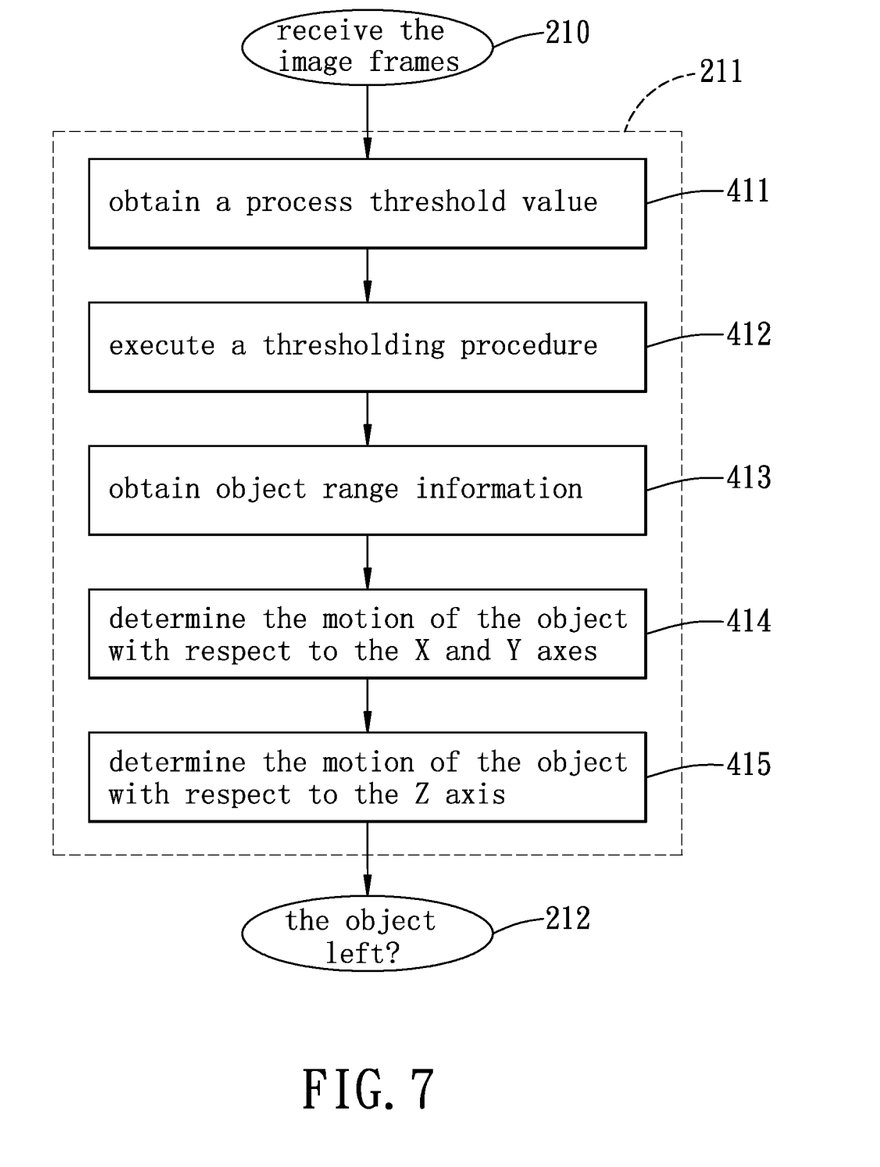
FIG. 7 is a flow chart illustrating steps of determining a motion of the object.

Further referring to FIG. 7, sub-steps of step 211 will now be described in detail in the following. It is noted that, in this embodiment, two image frames are received successively, and the three-dimensional coordinate system includes an X axis and a Y axis cooperating to define an image plane, and a Z axis perpendicular to the image plane.

In sub-step 411, the processor 12 is operable to calculate two average luminance values that are associated with the two image frames as two process threshold values, respectively. Each of the average luminance values is based on the pixel data sets of a respective one of the two image frames that are received in step 210. Alternatively, for each of the two image frames, the processor 12 may be configured to obtain a median value among the luminance values of the pixel data sets, and to use the median values as the process threshold values, respectively. It is noted that, the process threshold values may be obtained using balanced histogram thresholding method (BHT) in other embodiments.

In sub-step 412, the processor 12 is operable to execute a thresholding procedure upon each of the two image frames that are acquired in step 210. The processor 12 is then, in sub-step 413, operable to obtain object range information indicating where the object is detected in the image frames received in step 210.

Subsequently, the processor 12 is operable to determine the motion of the object with respect to the X and Y axes, according to the object range information in sub-step 414. The processor 12 is also operable to determine the motion of the object with respect to the Z axis, according to the object range information and/or luminance trace value (i.e., the average luminance values in this embodiment) in sub-step 415.

Figure 5:
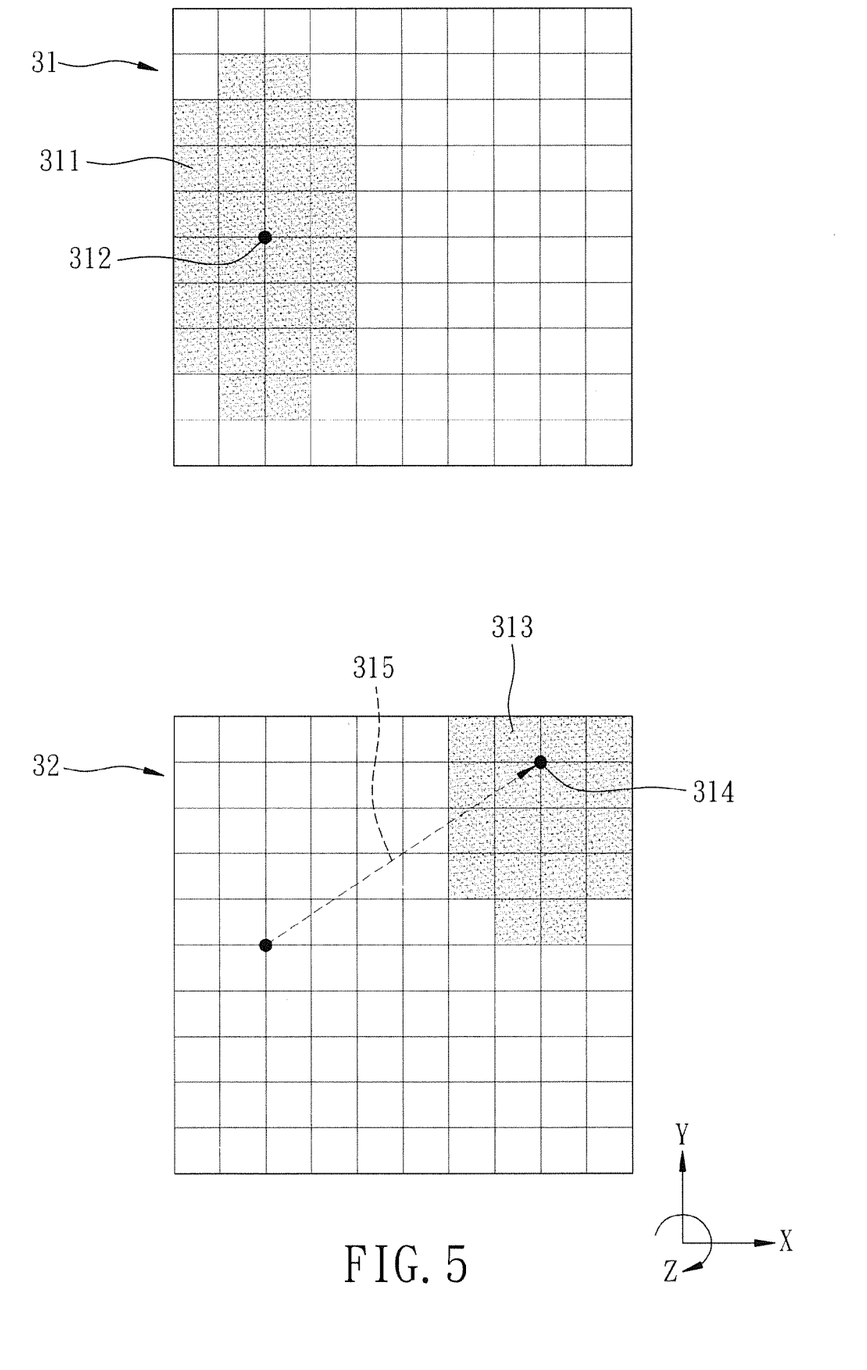
FIG. 5 is a schematic diagram illustrating two image frames that are generated by an image acquiring unit of the motion recognition device in a first operation mode, and that are processed by a thresholding procedure, according to the preferred embodiment.

The following paragraphs provide an example of the determination of the motion of the object in step 211. FIG. 5 illustrates two image frames 31 and 32 that are successively received (e.g., the image frame 31 is received at time $t_1$, and the image frame 32 is received at time $t_1+\Delta t_1$), and are processed by the thresholding procedure in sub-step 412. Each of the two image frames 31 and 32 includes an object image 311, 313. In this case, the object range information indicates where the object images 311 and 313 (as reflected by the object) are detected in the image frames 31 and 32. Accordingly, the motion of the object on the image plane during the time interval $\Delta t_1$ can be determined based on the object range information, such as the displacement of the barycenters 312 and 314 of the object images 311 and 313 (as indicated by a dashed line 315). A subsequent image frame in the series of image frames is then received at time $(t_1+2\Delta t_1)$, and is processed with the image frame 32 using the aforementioned procedure so as to determine the motion of the object in the subsequent image frame and the image frame 32. That is, the processor 12 is operable to obtain a series of the average luminance values that are associated with the detected object in the series of image frames.

For the motion with respect to the Z axis, the processor 12 is operable to determine that the object moves away from the image plane along the Z axis when the luminance trace values (i.e., the average luminance values) decrease with time, and that the object moves toward the image plane along the Z axis when the luminance trace values increase with time.

Figure 6:
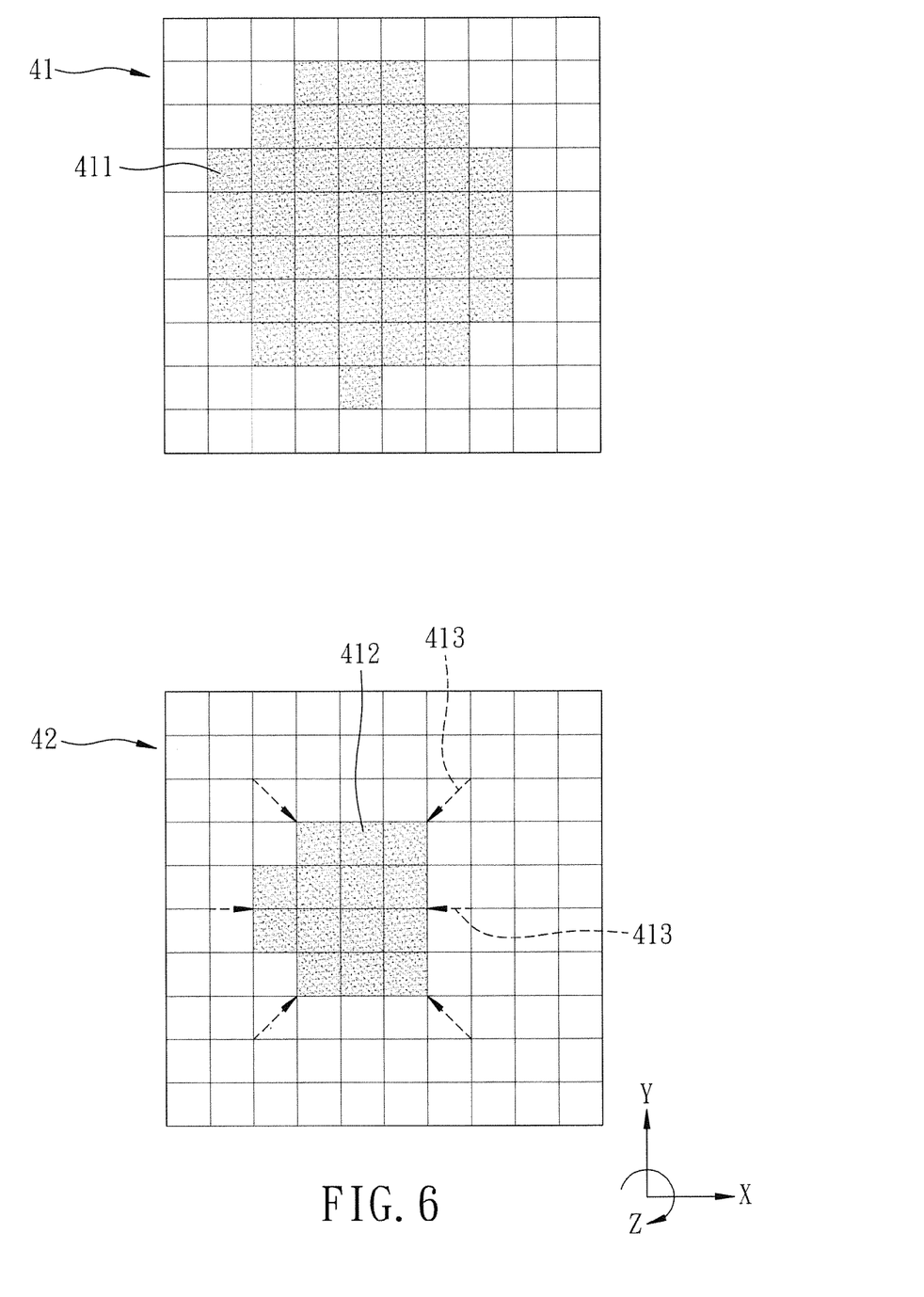
FIG. 6 is a schematic diagram illustrating two image frames that are generated by the image acquiring unit in a second operation mode, and that are processed by a thresholding procedure, according to the preferred embodiment.

In other embodiments, the object range information of the two object images 311 and 313 (for example, areas and edges of the object images 311 and 313) may be used to determine the motion of the object. According to another example, the motion of the object on the image plane during the time interval $\Delta t_1$ can be determined by identifying the displacement of the edges of the object images 311 and 313, and the motion with respect to the Z axis can be determined by comparing the areas of the object images. As shown in FIG. 6, two image frames 41 and 42 are successively received (e.g., the image frame 41 is received at time $t_2$, and the image frame 42 is received at time $t_2+\Delta t_2$). Each of the image frames 41 and 42 includes an object image 411, 413. The processor 12 is operable to determine that the object moves away from the image plane along the Z axis when the area of the object image 411 is larger than the area of the object image 413, and that the object moves toward the image plane along the Z axis when the area of the object image 411 is smaller than the area of the object image 413.

Referring back to FIG. 2, after the motion of the object is determined, the processor 12 is operable to determine whether the object has left the detection area of the photodetector array 111 of the image acquiring unit 11 in step 212. In this embodiment, the processor 12 is operable to determine whether the object has left the detection area of the photodetector array 111 by comparing the last one of the average luminance values (i.e., derived from the last two of the image frames) with a predetermined lower threshold value. When the last one of the average luminance values is smaller than the predetermined lower threshold value, the processor 12 is operable to determine that the object has left the detection area of the photodetector array 111, and the flow goes back to step 202. When the last one of the average luminance values is larger than the predetermined lower threshold value, the processor 12 is operable to determine that the object has not left the detection area of the photodetector array 111, and the flow goes back to step 208.

The following paragraphs provide description of the second operation mode. In step 214, the driver 13 is operable to deactivate the lighting modules 141 of the lighting unit 14.

After the lighting modules 141 are deactivated, the processor 12 is operable to receive at least one image frame from the image acquiring unit 11 in step 215.

In step 216, the processor 12 is operable to generate a third control signal for adjusting the photodetectors 113 of the photodetector array 111. The image acquiring unit 11 is operable to adjust parameters associated with the photodetectors 113 of the photodetector array 111 in step 217 (e.g., exposure value and/or exposure time), so as to obtain an optimum exposure condition for the image frames acquired thereafter.

After the parameters of the photodetectors 113 of the photodetector array 111 are adjusted, the processor 12 is operable to receive at least one image frame from the image acquiring unit 11 in step 218, and is operable to perform the object detecting procedure to determine whether an object is detected in said at least one image frame in step 219.

In the object detecting procedure in step 219, the processor 12 computes a third luminance value according to said at least one of the image frames received in step 218. Afterwards, the processor 12 is operable to compare the third luminance value with a third predetermined threshold value (determined from previous experiments involving various ambient light intensities when the lighting modules 141 are deactivated), and to determine that the object is detected in said at least one image frame received in step 218 when the third luminance value is smaller than the third predetermined threshold value (i.e., the ambient light is shadowed by the object). Similar to the procedure of step 207, the processor 12 is operable to calculate an average of luminance values from the pixel data sets of said at least one image frame received in step 218 as the third luminance value based on the average luminance value. The flow goes to step 220 when the object is detected, and goes back to step 202 when otherwise.

When it is determined that the object is detected, the processor 12 is operable to receive a series of the image frames from the image acquiring unit 11 in step 220. Then, the processor 12 is operable to determine the motion of the object with respect to a three-dimensional coordinate system according to the image frames thus received in step 221.

It should be noted that operation of step 221 is similar to that of step 211. However, in step 221 of the second operation mode, the processor 12 is operable to determine that the object moves away from the image plane along the Z axis when the average luminance values increase with time, and that the object moves toward the image plane along the Z axis when the average luminance values decrease with time.

After the motion of the object is determined, the processor 12 is operable to determine whether the object has left the detection area of the photodetector array 111 in step 222. In this embodiment, the processor is operable to determine whether the object has left the detection area of the photodetector array 111 by comparing the last one of the average luminance values (i.e., obtained from the last two of the image frames) with a predetermined upper threshold value. When the last one of the average luminance values is larger than the predetermined upper threshold value, the processor 12 is operable to determine that the object has left the detection area of the photodetector array 111, and the flow goes back to step 202. When the last one of the average luminance values is smaller than the predetermined upper threshold value, the processor 12 is operable to determine that the object has not left the detection area of the photodetector array 111, and the flow goes back to step 220.

To sum up, the method for sensing a motion of an object and the motion recognition device 1 for implementing the same are provided. The motion recognition device 1 is further configured to implement various additional functions, thereby providing more versatility during use.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for sensing a motion of an object, said method to be implemented by a motion recognition device that includes an image acquiring unit, a processor, and at least one lighting module for providing a light source, said method comprising the following steps of:
    a) configuring the image acquiring unit to acquire continuously a series of image frames by detecting intensity of light received thereby;
    b) configuring the processor to receive at least one of the image frames from the image acquiring unit;
    c) configuring the processor to:
        compute, from at least one of the image frames received in step b), a first luminance value that is associated with ambient light;
        compare the first luminance value with a first predetermined threshold value; and
        select a first operation mode when the first luminance value is smaller than the first predetermined threshold value;
    d) when the first operation mode is selected in step c), configuring the processor to generate a control signal for activating the lighting module, and to determine whether an object is detected by the following sub-steps of:
        d11) configuring the image acquiring unit to acquire at least one image frame;
        d12) configuring the processor to compute a second luminance value according to said at least one image frame acquired in sub-step d1);
        d13) configuring the processor to compare the second luminance value with a second predetermined threshold value; and
        d14) when it is determined in sub-step d13) that the second luminance value is larger than the second predetermined threshold value, configuring the processor to determine that the object is detected in said at least one image frame acquired in sub-step d1); and
    e) when it is determined in sub-step d14) that the object is detected, configuring the processor to receive the image frames from the image acquiring unit, and to determine a motion of the object with respect to a three-dimensional coordinate system according to the image frames thus received.

2. The method as claimed in claim 1, wherein, when the first operation mode is selected, step e) includes the following sub-steps of:
    e1) according to the image frames received in step e), configuring the processor to obtain a series of luminance trace values that are associated with the object detected in the image frames; and
    e2) configuring the processor to determine the motion of the object based on the luminance trace values obtained in sub-step e1).

3. The method as claimed in claim 2, the three-dimensional coordinate system including an X axis and a Y axis cooperating to define an image plane, and a Z axis perpendicular to the image plane, wherein:
    each of the image frames acquired by the image acquiring unit includes a plurality of pixel data sets;
    in sub-step e1), the processor is further configured to calculate a series of average luminance values as the luminance trace values, respectively, each of the average luminance values being based on the pixel data sets of a respective one of the image frames that are received successively in step e); and
    in sub-step c2), the processor is configured to determine that the object moves away from the image plane along the Z axis when the luminance trace values decrease with time, and that the object moves toward the image plane along the Z axis when the luminance trace values increase with time.

4. The method as claimed in claim 1, wherein:
    in step c), the processor is further configured to select a second operation mode when the first luminance value is larger than the predetermined threshold value;
    and in step d), when the second operation mode is selected, the processor is further configured to generate a control signal for deactivating the lighting module of the lighting unit.

5. The method as claimed in claim 4, wherein, when the second operation mode is selected, step d) further includes the following sub-steps of:
    d21) configuring the image acquiring unit to acquire at least one image frame;
    d22) configuring the processor to calculate a third luminance value from said at least one image frame acquired in sub-step d21);
    d23) configuring the processor to compare the third luminance value with a third predetermined threshold value; and
    d24) configuring the processor to determine that the object is detected in said at least one image frame acquired in sub-step d21) when the third luminance value is smaller than the predetermined third threshold value.

6. The method as claimed in claim 1, wherein step e) further includes the following steps of:
    e3) according to the image frames received in step c), configuring the processor to obtain a series of object range information indicating where the object is detected in the image frames; and e4) configuring the processor to determine the motion of the object according to the object range information.

7. The method as claimed in claim 1, further comprising a step of:
configuring the processor to obtain a series of color temperature values that are associated with ambient light from the image frames.

8. The method as claimed in claim 1, further comprising a step of:
configuring the processor to obtain a series of brightness values that are associated with ambient light from the image frames.

9. A motion recognition device comprising:
a lighting unit having at least one lighting module for providing a light source at an illumination area;
an image acquiring unit including a photodetector array and an analog-to-digital converter (ADC), said photodetector array including a plurality of photodetectors arranged on a two-dimensional plane and being operable to generate sense signals by detecting intensity of light received thereby, said photodetector array having a detection area, at least a part of which overlaps the illumination area of said at least one lighting module, said ADC being coupled to said photodetector array for receiving the sense signals therefrom and being operable to convert the sense signals into image frames; and
a processor coupled to said ADC of said image acquiring unit and co-operable with said image acquiring unit to implement a method as claimed in claim 1 for determining whether an object is detected in at least one of the image frames and, when the determination is affirmative, determining a motion of the object with respect to a three-dimensional coordinate system according to apart of the image frames that are acquired after acquisition of said at least one of the image frames where the object is detected.

10. The motion recognition device as claimed in claim 9, wherein said processor is operable to obtain object range information that is associated with the object, and to determine the motion of the object based on the object range information thus obtained.

11. The motion recognition device as claimed in claim 9, wherein at least one of said photodetectors includes a color filter, and said processor is operable to obtain color temperature values that are associated with ambient light from the image frames.

12. The motion recognition device as claimed in claim 9, wherein said processor is operable to obtain brightness values that are associated with ambient light from the image frames.

13. A method for sensing a motion of an object, said method to be implemented by a motion recognition device that includes an image acquiring unit, a processor, and at least one lighting module for providing a light source, said method comprising the following steps of:

a) configuring the image acquiring unit to acquire continuously a series of image frames by detecting intensity of light received thereby;

b) configuring the processor to receive at least one of the image frames from the image acquiring unit;

c) configuring the processor to compute, from at least one of the image frames received in step b), a first luminance value that is associated with ambient light, to compare the first luminance value with a first predetermined threshold value, and to select a second operation mode when the first luminance value is larger than the first predetermined threshold value;

d) when the second operation mode is selected in step c), configuring the processor to generate a control signal for deactivating the lighting module, to receive at least one of the image frames, and to determine whether an object is detected in said at least one of the image frames; and e) when the determination made in step d) is affirmative, configuring the processor to receive the image frames from the image acquiring unit, and to determine a motion of the object with respect to a three-dimensional coordinate system according to the image frames thus received.

14. The method as claimed in claim 13, wherein, in step d), the processor is configured to determine whether an object is detected by the following sub-steps of:

d1) configuring the image acquiring unit to acquire at least one image frame;

d2) configuring the processor to calculate a third luminance value from said at least one image frame acquired in sub-step d1);

d3) configuring the processor to compare the third luminance value with a third predetermined threshold value; and d4) configuring the processor to determine that the object is detected in said at least one image frame acquired in sub-step d1) when the third luminance value is smaller than the predetermined third threshold value.

15. A motion recognition device comprising:
a lighting unit having at least one lighting module for providing a light source at an illumination area;
an image acquiring unit including a photodetector array and an analog-to-digital converter (ADC), said photodetector array including a plurality of photodetectors arranged on a two-dimensional plane and being operable to generate sense signals by detecting intensity of light received thereby, said photodetector array having a detection area, at least a part of which overlaps the illumination area of said at least one lighting module, said ADC being coupled to said photodetector array for receiving the sense signals therefrom and being operable to convert the sense signals into image frames; and
a processor coupled to said ADC of said image acquiring unit and co-operable with said image acquiring unit to implement a method as claimed in claim 13 for determining whether an object is detected in at least one of the image frames and, when the determination is affirmative, determining a motion of the object with respect to a three-dimensional coordinate system according to a part of the image frames that are acquired after acquisition of said at least one of the image frames where the object is detected.

* * * * *